United States Patent
Powell et al.

(10) Patent No.: US 7,551,068 B2
(45) Date of Patent: Jun. 23, 2009

(54) VEHICLE SEAT ALERT SYSTEM

(75) Inventors: David A. Powell, Bloomfield Hills, MI (US); H. Winston Maue, Northville, MI (US); Oliver J. Young, Grosse Pointe, MI (US); John F. Nathan, White Lake, MI (US)

(73) Assignee: Lear Corporation, Southfield, MI (US)

( * ) Notice: Subject to any disclaimer, the term of this patent is extended or adjusted under 35 U.S.C. 154(b) by 313 days.

(21) Appl. No.: 11/467,619

(22) Filed: Aug. 28, 2006

(65) Prior Publication Data

US 2008/0055055 A1   Mar. 6, 2008

(51) Int. Cl.
B60Q 1/00 (2006.01)

(52) U.S. Cl. .................. 340/438; 340/436; 340/439; 340/407.1; 340/425.5; 340/665; 340/666; 340/667

(58) Field of Classification Search .......... 340/438, 340/436, 439, 407.1, 425.5, 665, 666, 667, 340/903; 701/29, 45, 300, 301; 297/331, 297/335, 336
See application file for complete search history.

(56) References Cited

U.S. PATENT DOCUMENTS

| | | | |
|---|---|---|---|
| 3,632,168 A * | 1/1972 | Barello et al. ......... 297/378.12 |
| 5,348,370 A * | 9/1994 | Fukuoka ................. 297/217.3 |
| 5,699,057 A * | 12/1997 | Ikeda et al. ............... 340/937 |
| 6,255,956 B1 | 7/2001 | Tingley et al. |
| 6,278,358 B1 | 8/2001 | Spoto et al. |
| 6,278,377 B1 | 8/2001 | DeLine et al. |
| 6,437,687 B2 | 8/2002 | Spencer |
| 6,575,902 B1 | 6/2003 | Burton |
| 7,113,100 B2 * | 9/2006 | Yoshinori et al. ........... 340/575 |
| 2004/0044293 A1 | 3/2004 | Burton |
| 2004/0104590 A1 | 6/2004 | Kikuchi et al. |
| 2005/0012606 A1 | 1/2005 | Lee |
| 2005/0017861 A1 | 1/2005 | Hunter |
| 2005/0041819 A1 | 2/2005 | Brown |
| 2006/0097857 A1 * | 5/2006 | Osaka et al. ................ 340/435 |
| 2006/0255920 A1 | 11/2006 | Maeda et al. |
| 2007/0290535 A1 * | 12/2007 | Meredith et al. ......... 297/217.1 |

FOREIGN PATENT DOCUMENTS

| | | |
|---|---|---|
| DE | 3235373 A1 | 3/1984 |
| DE | 19930759 C1 | 11/2000 |
| DE | 10026048 A1 | 12/2001 |
| GB | 2437158 A | 10/2007 |
| WO | 2007060175 A1 | 5/2007 |

OTHER PUBLICATIONS

Great Britain Search and Examination Report for corresponding Application No. GB0715842.1, mailed Dec. 6, 2007, 7 pages.

* cited by examiner

Primary Examiner—Hung T. Nguyen
(74) Attorney, Agent, or Firm—Brooks Kushman P.C.

(57) ABSTRACT

An alerting element for use with occupant seating to alert a seat occupant with a haptic and/or audible sensation. The alerting element being suitable for use with any type of seat, including vehicle seats. The alerting element optionally including a striking element for striking a structural component of the seat, and thereby, generating an alerting sensation.

18 Claims, 1 Drawing Sheet

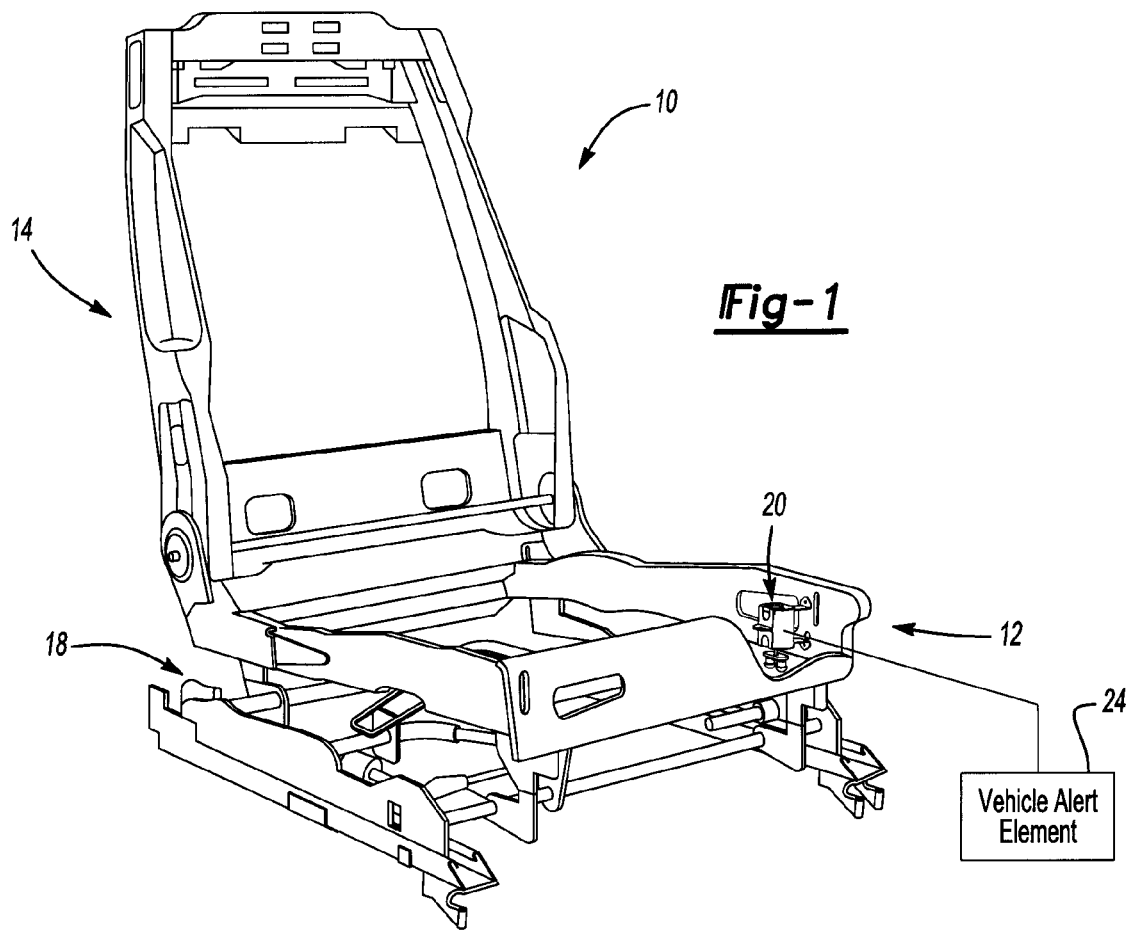
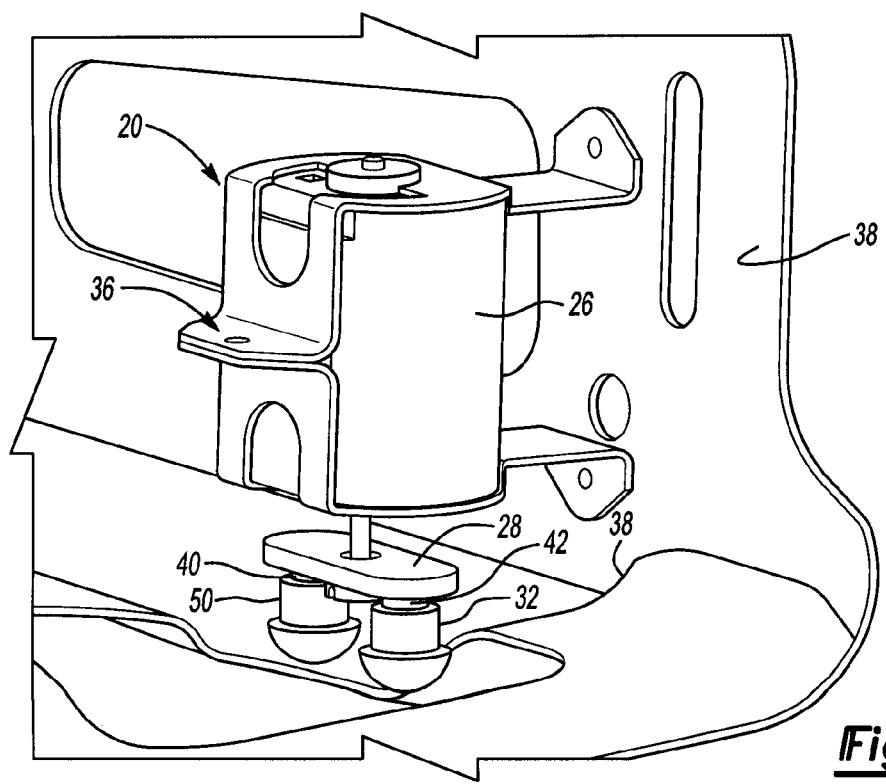

VEHICLE SEAT ALERT SYSTEM

BACKGROUND OF THE INVENTION

1. Field of the Invention

The present invention relates to methods and systems associated with alerting an occupant of a vehicle seat.

2. Background Art

While driving a vehicle, whether the vehicle is an automobile, watercraft, aircraft, etc., the operator is typically seated within a vehicle seat. A controller or other element associated with the vehicle may monitor any number of operating conditions and report the conditions to the operator through any number of displays, such as but not limited to displays located within an instrument panel or other location viewable to the occupant.

In addition to or in place of the viewable displays, some vehicles are now including haptic seats for alerting the occupant through the sensation of touch. Rotary driven eccentric weights are commonly employed for this purpose. These elements include a weight offset relative to a rotary axis such that rotation of the axis cause the weight to eccentrically vibrate a motor used to drive the axis, thereby imparting the haptic sensation to the seat cushion.

Such eccentrically weight motors are typically located within non-structural elements of the vehicle seat, such as but not limited to seat foam and cushioning. This positioning prevents the element from imparting audible and vibration based sensations to the occupant. This positioning is also typically encapsulated within the foam or cushioning and/or within cloth or other coverings of the seat, making it relatively difficult to access the motor.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates a vehicle seat in accordance with one non-limiting aspect of the present invention; and FIG. 2 illustrates a striker in accordance with one non-limiting aspect of the present invention.

DETAILED DESCRIPTION OF THE PREFERRED EMBODIMENT(S)

FIG. 1 illustrates a structural component view of a vehicle seat 10 in accordance with one non-limiting aspect of the present invention. The vehicle seat 10 may be associated with and used to support occupants in any type of vehicle, including but not limited to automobiles, watercraft, aircraft, etc. The seat 10 is shown for use in a vehicle but it may be easily adapted for use in any number of other environments without deviating from the scope and contemplation of the present invention.

The vehicle seat 10 may include a seat bottom 12 and seat back 14 for use in supporting the occupant, as one having ordinary skill in the art will appreciate. The seat bottom 12 may include any number of features for attaching the seat 10 to the vehicle and supporting a bottom portion of the occupant. The seat back 14 may similarly include any number of features for supporting a back portion of the occupant.

For example, the seat bottom 12 and back 14 may include cushioning, trim, lumbar, massagers, and any number of elements (not shown) to facilitate supporting and comforting the seat occupant. As shown, the seat bottom 12 and back 14 include a structural frame arrangement having a number of structural components for use in supporting the occupant and other features of the seat, such as but not limited to supporting the seat cushioning, lumbar, trim, massagers, etc.

The structural components correspond with load bearing elements of the vehicle seat 10 that are used to either support the occupant, support another seat element, and/or attach the seat to the vehicle. The structural components may comprise an material suitable to providing rigid or relatively rigid structural support, such as but not limited to plastic, aluminum, steel, or other similarly strong material.

Vehicle seats of various design and construction may include any number of structural components and arrangements of the same. The structural components shown in FIG. 1 generally correspond with side rails and corresponding crossing members that may be used in both of the seat bottom 12 and back 14. The side rails may be used to provide an outside structural support for the crossing members, as one having ordinary skill in the art will appreciate.

The side rails and crossing members are shown as exemplary structural components and without intending to limit the scope and contemplation of the present invention. The present invention fully contemplates the use of any number of or type of structural components without deviating from the scope and contemplation of the present invention. For example, the vehicle seat 10 may include other structure components, such as but not limited to those associated with a seat adjustment mechanism 18 connected to the bottom side of the seat bottom.

In accordance with one non-limiting aspect of the present invention, the seat 10 may include one or more strikers 20. The strikers 20 may be used to alert the seat occupant to various operating conditions of the vehicle. Optionally, the one or more strikers 20 may be positioned relative to one or more of the structural components and used to strike the same when generating the alert. The strike induced by the striker 20 can be used to simultaneously impart haptic and audible sensations to the occupant.

A vehicle alert element 24 may be included within the vehicle to monitor vehicle operating conditions and to control striker operations as a function thereof. The vehicle alert element 24 may be configured to control operations of the striker 20 so as to generate occupant alerts as a function of the vehicle operating conditions, such as but not limited to striking the structural components in response to the occurrence of particular vehicle operating conditions.

The vehicle alert element 24 may be configured to monitor vehicle operating parameters and to generate a warning/seat control signal as a function thereof. The signal may be used to control vibrations within the seat, and thereby, alerting of the passenger. The controller may vary the characteristics and/or instructions embedded within the signal in order to control the type, frequency, amplitude, and other characteristics of the seat vibration.

For example, if the vehicle is an automobile, the vehicle alert element may be configured to determine lane departures, impending rear/side/front impacts, and drowsy driver conditions as a function any number of vehicle operating parameters. In more detail, the automobile may include video and/or other features for detecting lane departures, video/radar and/or other features to detect impending rear/side/front impacts, video and/or other features to monitor driver drowsiness (i.e., a driver response to visual indicators, posture, head positioning, etc. may be used to indicate drowsiness).

Of course, the vehicle alert element 24 may monitor and process any number variables for use in controlling seat sensations and the present invention is not intended to be limited to the foregoing. In particular, the present invention fully contemplates the use of any number of parameters for determining conditions under which it may be advantageous to alert the passenger. Moreover, the present invention fully contemplates varying or otherwise adjusting the sensation as a function of the severity of the alert and any number of other parameters.

FIG. 2 illustrates the striker 20 in accordance with one non-limiting aspect of the present invention. The striker 20 generally comprises a motor 26, rotary actuated armature 28, and a pair of striking elements 30-32. The motor 26 may be controlled to rotate the armature 28 such that the striking elements 30-32 collided with the structural component, and thereby, generate the simultaneous haptic and audible alert sensations.

The motor 26 may comprise any electronically controllable motor having capabilities sufficient to rotate the armature 28. Optionally, the rotation speed of the motor 26 may be controlled by the alert element 24 so as to permit generating alerts at different rotational frequencies and correspondingly different audible frequencies. For example, the alerts may be controlled such that more urgent alerts can be associated with high frequencies and/or the frequency during an alert can be increased/decreased in proportion to changes in operating conditions. Similarly, the user may select desirable audible and rotational frequencies to correspond with personal preferences with respect to the same.

A bracket 36 may be included for mounting the striker 20 to an upwardly extending portion of the seat bottom frame 12. The bracket 36 may be configured to orientate the striking elements 30-32 relative to a laterally extending face 38 of the seat frame 12 such that rotation of the armature 28 causes each of the striking elements 30-32 to collide with the face 38. This object to object contact imparted by the striking elements 30-32 in turn produces the haptic and audible alert.

The bracket 36 may be positioned with respect to the seat frame 12 such that the striker 20 is positioned proximate an opening 39. This allows the striker 20 to be easily inserted through a bottom side of the seat frame 12 should the topside be obstructed foam or other materials. The undersigned of the seat frame 12 around the opening 39 may be a exposed portion such that striker 20 may be easily reached for servicing and other operations.

Optionally, the striking elements 30-32 may be spring loaded and configured to travel vertically in response to contact with the face 38. The spring loading may allow the striking elements 30-32 to travel upwardly upon contact with the face 38 to a compressed position and to thereafter reflex downwardly to an uncompressed position once removed from the face 38. The face 38 may be aligned with the rotation of the armature 28 to facilitate such movement, i.e., the clockwise rotation shown in FIG. 1 may require the face 38 to rise from rear to back so as to permit the striking elements 30-32 to climb the face 38 with the clockwise rotation.

The spring loaded striking elements 30-32 may also produce an audible sound when respectively topping and bottoming out at the compressed and uncompressed positions. This sound may be coupled with the sound produced when striking the face 38 to provide a non-regular sound pattern which differentiates itself from the haptic/vibratory sensation imparted when the striking element 30-32 collides with the face 38. In this manner, the multiple sensations (vibratory and audible) generated by the striking elements 30-32 may provide a unique recognizable haptic/audible sensation that differentiates over elements providing only haptic sensations, such as but not limited to seat massagers.

The striking elements 30-32 are illustrated as hemispherical plastic nubs that ride vertically along a shaft 40-42 between the compressed and uncompressed position to collide with the armature 28. The nubs may include other elements to facilitate striking the face 38 and/or generating the audible sensations, such as but not limited to bells, symbols, etc. Likewise, the striking elements may include spokes, flares, and/or other elements (not shown) that rotate or otherwise strike the face 38 to generate different and/or additional audible sensations.

One non-limiting aspect of the present invention relates to a method of generating an alert. The method may be embodied in a computer-readable medium or other logically executing medium having capabilities suitable for executing one or more of the steps described below. For example, the vehicle alert system 24 may be configured with such capabilities.

The method may include determining a triggering event associated with generating an alert for the seat occupant. The triggering event may be associated with any number of vehicle operating parameters and/or other parameters associated with the seat's environment. The triggering event determination may include assessing the severity of the event and/or assessing the severity over time such as to permit generation of more urgent or time varying alerts. Optionally, the method may include the occupant specifying one or more different haptic/audible sensations for different operating conditions.

The method may further include generating an alert signal for use in controlling the striker 20 to generate the alert. The alert signal may be communicated to the striker 20 over a vehicle communication bus and/or some other vehicle communication medium. Optionally, the alert signal may include information associated with the alert and for use by the striker in selecting the frequency, duration, pulse, and other parameters associated with generating the alert.

For example, the data may specify a pulsing action whereby the rotational speed of the armature is varied over time to impart particular sensations during the alert. The data may also specify a duration of alert, such as but not limited to the number of armature rotations to be completed for the alert, the speed of armature rotation, and/or any number of other parameters associated with controlling operations of the striker.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle system for alerting an occupant within a vehicle seat, the system comprising: a vehicle alert element for generating an alert signal in response to a triggering event;

a striker configured to strike a structural component of the vehicle seat upon receipt of the alert signal, the striker having a striking element slidable along a support, the striking element sliding from a first to a second position while in contact with the structural component; and wherein the striking element is attached to a rotary actuated armature and the striking element is spring-loaded to progressively ride up an inclined face of the structural component to the second position as the armature rotates, the second position being defined as a compressed position proximate at top of the inclined face, when struck against the face and to reflex to the first position, the first position being defined as an uncompressed position when removed from the face by the rotary action of the armature.

2. The system of claim 1 wherein the structural component is an exposed element of the vehicle seat.

3. The system of claim 2 wherein the structural component is exposed from a bottom side of the vehicle seat.

4. The system of claim 1 wherein the structural element is a bottom support frame of the vehicle seat.

5. The system of claim 1 wherein the striking includes a chime that generates an audible sound each time the striking element reaches an extreme of each of the compressed and uncompressed positions.

6. The system of claim 1 wherein the vehicle alert element controls a rotary speed of the striking element in order to vary a severity of the alert.

7. The system of claim 1 wherein the armature includes a second striking element to counterbalance against the other striking element and prevent eccentric based vibrations.

8. The system of claim 1 wherein the striker includes a bracket for mounting to an upwardly extending portion of the structural component, the bracket configured to orientate the armature so as to cause the striking element to strike a laterally extending portion of the vehicle seat, the laterally extending portion being define relative to the upwardly extending portion of the structural component.

9. The system of claim 1 wherein the striker simultaneously creates haptic and audible sensations when generating the alert.

10. The system of claim 1 wherein the striker is evenly balanced such that the alert is generated without eccentric based vibrations.

11. The system of claim 1 wherein the first position corresponds with the striking element being a first distance away from an end of the support and the second position corresponds with the striking element being a second distance away from the end of the support, the second distance being less than the first distance.

12. A vehicle system for alerting an occupant within a vehicle seat, the system comprising: a striker controllable in response to an alert signal and mounted to the vehicle seat, the striker configured to strike a striking element against a structural component of the vehicle seat in order to generate audible and haptic sensation for use in alerting the occupant, the haptic sensation being caused by contact of the striking element inducing a vibration in the structural element and the audible sensation being caused by a chime within the striking element vibrating in response to the striking element contacting the structural component; and wherein the striking element is spring-loaded and configured to ride up a face of the structural component to a compressed position when struck against the face and to reflex to an uncompressed position when removed from the face by the rotary action of the armature.

13. The system of claim 12 wherein the striker includes a rotary actuated armature connected to the striking element and driven by a motor, the motor being controlled by an alert signal.

14. The system of claim 13 wherein the vehicle alert element controls a rotary speed of the motor in order to vary a severity of the alert.

15. The system of claim 13 wherein the armature includes a second striking element to counterbalance against the other striking element and prevent eccentric based vibrations.

16. The system of claim 1 wherein the striking element is configure to generate audible sounds upon reaching the compressed position and uncompressed position.

17. A striker for use in alerting a seat occupant, the striker comprising:
    a motor configured for rotating an armature as a function of an alert signal received from an alert element, the alert signal associated with alerting the seat occupant;
    a striking element connected to the armature and configured to strike against a structural component of a seat in order to simultaneously generate an audible and haptic sensation for use in alerting the seat occupant; and
    wherein the striking element is spring-loaded and configured to ride up a face of the structural component to a compressed spring position when struck against the face and to reflex to a less compressed spring position when removed from the face by the rotary action of the armature.

18. The striker of claim 17 wherein the striking element includes a chime to generate audible sounds upon reaching an extreme of each of the compressed and uncompressed positions.

* * * * *

UNITED STATES PATENT AND TRADEMARK OFFICE
CERTIFICATE OF CORRECTION

PATENT NO. : 7,551,068 B2  Page 1 of 1
APPLICATION NO. : 11/467619
DATED : June 23, 2009
INVENTOR(S) : David A. Powell et al.

It is certified that error appears in the above-identified patent and that said Letters Patent is hereby corrected as shown below:

Column 6, Line 27, Claim 16:

Delete "claim 1" and insert -- claim 12 --.

Signed and Sealed this

Twenty-ninth Day of September, 2009

David J. Kappos
*Director of the United States Patent and Trademark Office*